Feb. 22, 1944.  F. H. HEHEMANN  2,342,276
VALVE
Filed Sept. 4, 1942
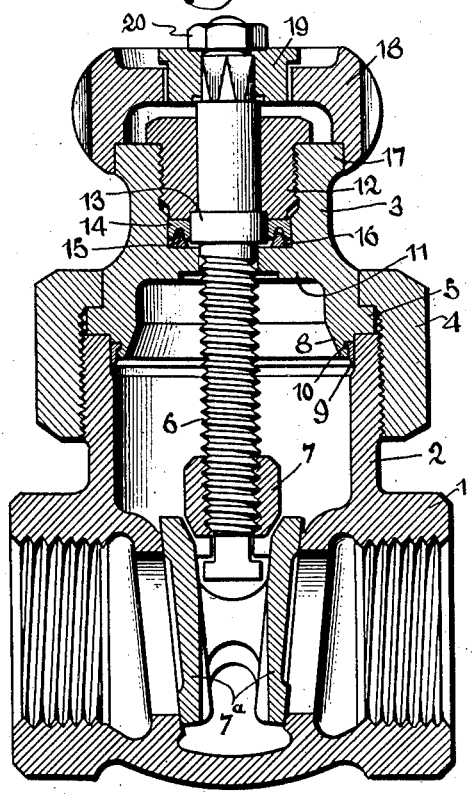
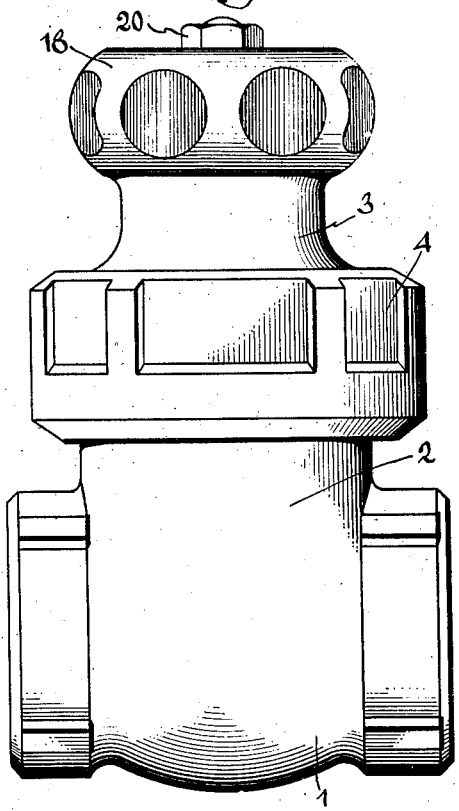
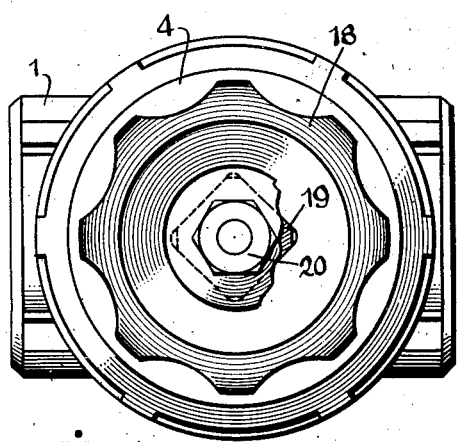
INVENTOR.
Frederick H. Hehemann
BY
Oliver B. Kaiser
ATTORNEY.

Patented Feb. 22, 1944

2,342,276

UNITED STATES PATENT OFFICE 2,342,276

VALVE

Frederick H. Hehemann, Cincinnati, Ohio

Application September 4, 1942, Serial No. 457,259

2 Claims. (Cl. 251—49)

This invention relates to improvements in valves, primarily of the gate type, or devices employing a rotatable non-rising or non-axially movable operating stem.

An object of the invention is to sheath or shield the head end of the valve stem to safeguard it against being bent incidental to any rough handling it may encounter in some fields of service.

Another object is to sheath the stem of the valve by means of its operating hand wheel or handle knob, the knob skirted to cap and be telescopically guided upon the bonnet of the valve.

Another object of the invention is to provide a simple and compact non-adjustable stuffing box for the valve stem for making a seal with a minimum friction under high pressures, effected by a packing ring having an annular channel in one face or U-shaped in cross section for cooperation with an expanding or spreader ring.

Another object is to provide the bonnet joint with a self-sealing packing ring of a type which will maintain an absolute tight joint at a maximum pressure for the valve, and to meet over pressures occasionally encountered in some classes of service.

Another object is to provide a valve with a shielded stem, a non-adjustable stuffing box, and a sealed bonnet joint of a character to produce a very compact and light structure for high pressure service where limited space and limitations on weight are important factors.

Various other features and advantages of the invention will be more fully apparent from a description of the accompanying drawing, in which:

Figure 1 is a central vertical section through the improved gate valve.

Figure 2 is a side elevation of the same.

Figure 3 is a top plan view of the valve.

Figure 4 is an enlarged fragmentary sectional view, illustrating a portion of the valve casing and bonnet, detailing the improved packing rings for the bonnet joint and valve stem.

Referring to the drawing, 1 indicates the valve casing or body, having a cylindrical head 2 and carrying a bonnet 3. The bonnet is clamped to the upper end of the head by a union nut 4 screw-threaded upon the exterior of the head and having an inturned flange engageable over an annular coupling flange 5 of the bonnet operating upon the upper or outer end of the head. The bonnet rotatively supports a valve operating stem 6, the stem having a threaded connection with a gate elevating nut 7, the nut carrying a pair of oppositely directed valve discs 7ᵃ.

The valve gate construction may be of conventional form, and, as illustrated, is representative of the type as disclosed in a prior patent issued to me March 19, 1940, No. 2,193,922, and to which reference may be had for a more complete disclosure and description of the gate than embodied herein, as its specific construction forms no part of the present invention.

Upon rotation of the stem, the elevating nut, which is guidingly confined against rotation, together with the gate suspendingly connected with the nut, are moved in a direction appropriate with the direction of stem rotation for either an opening or closinig control of the gate.

The lower end of the bonnet is of sleeve or hub form, which preferably is provided with the coupling flange 5 for engaging and seating upon the upper end of the cylindrical head and clamped thereto by the union nut 4, and a hub or sleeve extension 8 beyond the coupling flange telescopically engaged into the bore of or interfitting with the head. The periphery of the sleeve extension 8 is annularly channeled and recessed for the reception of a packing ring 9 of angle form in cross section to provide an inwardly extended rim 10 engaging into the annular channel to secure and confine the packing upon the bonnet. The packing ring extends slightly beyond the end of the bonnet, and bears against the inner surface of the cylindrical head, and against which it is impinged while the pressure is in the valve for maintaining an absolutely tight joint at pressures up to the point of failure of the valve without unduly pre-stressing the bonnet joint.

As the valve was developed for use in the production fields of the petroleum industry, and especially in acidizing and cementing operations, as well as in the control of sludges and muds, the self-sealing feature of the packing ring will maintain an absolutely tight joint against occasional over-pressures encountered in acidizing and cementing operations. The joint seal is therefore an important characteristic.

A septum 11, centrally apertured for stem traverse, interiorly divides the bonnet, and provides a base for a stuffing box and a bearing for the thrust collar 13 formed on the stem. A non-adjustable gland 12 traversed by the stem is screw-threaded into the upper end of the bonnet, and has its lower end centrally recessed to provide a thrust bearing for the stem thrust collar 13. The lower end of the gland bears against and positions a packing ring 14. The packing ring is of U-form in cross section, thereby providing an annular channel 15 in its lower or pressure side. A conical spreader ring 16, seated upon the upper side of the septum, positions the wings of the packing ring to make the initial contact between the stem thrust collar 13 and the inner wing of the packing ring, and between the wall of the bonnet and the outer wing of the packing ring. Once pressure is applied to the valve the packing ring 14 is self-sealing. The structure forms a non-adjustable stuffing box, simple and compact, and securely sealing against leakage with a minimum of friction under high pressure.

The upper end of the bonnet is bossed or finished to provide an annular head 17 for a socket engagement into a side of a hand wheel or knob 18, removably fixed upon the upper or free end of the valve stem 6. The lower side of the stem operating knob is recessed or skirted to form a socket for rotatively embracing and capping the head of the bonnet, and an enclosure for the stuffing box. The knob thereby serves to sheath and shield the stem, and safeguard it from being bent by any rough handling the valve may receive in service, particularly in the field herein referred to.

The knob is closely guided on the bonnet and loosely fitted to the stem so that the force of any external blow thereupon is absorbed by the rugged bonnet rather than being transmitted to the stem. The web or disc of the hand wheel or knob has a free fit on the stem, as provided with a rectangular opening interfittingly receiving a relative coupling collar 19 socketed upon a squared portion of the stem, and held in place by a lock nut 20 screw-threaded upon the end of the stem.

The mechanical structure for the valve of a wedge disc gate type lends itself to the production of a symmetrical and stocky design, enhancing the same esthetically, and a departure from the conventional standards. It provides a structure of extreme stability, compactness, and of reduced weight for high pressure service, and its stocky characteristics permit its use for a limited space as well as limitations on weight, which is an important desideratum.

Having described my invention, I claim:

1. A valve, comprising: a body and bonnet, a valve within said body having its actuating stem traversing the bonnet and journaled therein the bonnet having a peripheral bearing surface at its outer end concentric with the stem and a hand knob for rotating the stem having a rim telescopically engaged over and capping the outer end of the bonnet and in rotative bearing contact with said peripheral bearing surface of said bonnet, stabilizing the knob against lateral thrusts to the protection of the stem, the stem having a head socketed in the knob and in articulated coupling connection therewith.

2. A valve comprising: a body and a bonnet, a valve within said body having an actuating stem traversing said bonnet, a gland engaged within the outer end of the bonnet in screw threaded connection therewith and concentric about the stem providing a journal therefor, and an element of a stuffing box for packing the stem, the outer end of the gland having an annular flange in bearing contact with the outer end of the bonnet, a peripheral bearing surface portion at the outer end of said bonnet and concentric with the stem, a hand knob coupled to the outer end of the stem and having a rim portion which telescopically engages over the peripheral bearing surface portion of said bonnet and in rotative bearing contact therewith and capping the outer end of said bonnet and said gland, the bearing connection of the rim portion of the knob with the said peripheral bearing surface portion of the bonnet stabilizing the same against substantially inward or lateral thrusts for the protection of the stem.

FREDERICK H. HEHEMANN.